(12) United States Patent
Liu et al.

(10) Patent No.: US 11,347,352 B2
(45) Date of Patent: May 31, 2022

(54) VIRTUAL KEYBOARD ERROR CORRECTION BASED ON A DYNAMIC SPATIAL MODEL

(71) Applicant: Google LLC, Mountain View, CA (US)

(72) Inventors: Xu Liu, San Jose, CA (US); Shumin Zhai, Los Altos, CA (US); Adrian Pittman, San Francisco, CA (US); Billy Dou, Beijing (CN)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/079,492

(22) Filed: Oct. 25, 2020

(65) Prior Publication Data

US 2022/0129137 A1    Apr. 28, 2022

(51) Int. Cl.
G06F 3/048     (2013.01)
G06F 3/041     (2006.01)
G06F 3/04886   (2022.01)

(52) U.S. Cl.
CPC ...... *G06F 3/04186* (2019.05); *G06F 3/04886* (2013.01)

(58) Field of Classification Search
None
See application file for complete search history.

(56) References Cited

U.S. PATENT DOCUMENTS

| | | | |
|---|---|---|---|
| 5,748,512 A | 5/1998 | Vargas | |
| 2012/0154298 A1 | 6/2012 | Wu et al. | |
| 2013/0067382 A1* | 3/2013 | Townsend | G06F 3/04886 715/773 |
| 2014/0380224 A1* | 12/2014 | Zhang | G06F 3/0488 715/773 |
| 2017/0052702 A1* | 2/2017 | Norris, III | G06F 3/04886 |
| 2017/0090749 A1* | 3/2017 | Marsden | G06F 3/04886 |
| 2019/0294768 A1* | 9/2019 | McMurdie | G06F 21/316 |

OTHER PUBLICATIONS

Clover, Juli, "SwiftKey for iOS Updated With Tap Map Feature, Usage Statistics", Retrieved from Internet: https://www.macrumors.com/2015/04/02/swiftkey-updated-with-tap-map/, Apr. 2, 2015, 8 pages.
EPO, International Search Report for International Patent Application No. PCT/US2020/064545, dated Jul. 9, 2021, 4 pages.
EPO, Written Opinion for International Patent Application No. PCT/US2020/064545, dated Jul. 9, 2021, 7 pages.
EPO, Extended European Search Report for European Patent Application No. 21194818.7, dated Nov. 25, 2021, 9 pages.

* cited by examiner

*Primary Examiner* — William C Trapanese
(74) *Attorney, Agent, or Firm* — IP Spring

(57) ABSTRACT

A method includes detecting a touch input by a user at a position on a virtual keyboard. The method further includes applying a spatial model to map the touch input to one or more first candidate keys of the virtual keyboard, wherein the spatial model maps the touch input to the one or more first candidate keys based on a heatmap of prior touch inputs by the user. The method further includes applying a language model to map the touch input to one or more second candidate keys of the virtual keyboard, wherein the language model maps the touch input to the one or more second candidate keys based on comparing the position of the touch input to one or more predicted next keys. The method further includes selecting a particular key of the one or more first and second candidate keys as indicated by the touch input.

20 Claims, 10 Drawing Sheets
(1 of 10 Drawing Sheet(s) Filed in Color)

500

525

650

670

VIRTUAL KEYBOARD ERROR CORRECTION BASED ON A DYNAMIC SPATIAL MODEL

BACKGROUND

With the prevalence of mobile devices, the use of virtual keyboards is common. Virtual keyboards, however, can be frustrating to use due to a difference between the user's expected position on a virtual keyboard and the real tapped position. For example, a recent study on types of typing errors found that 37% of typing errors in English language virtual keyboards were due to spacebar omissions and 60% of typing errors were related to the spacebar, such as confusion between the spacebar and the C, V, B, and N letters in the last row of the virtual keyboard. This may be the result of users having wider fingers, tapping with only one hand, not using sufficiently precise touches, inherent inaccuracies of touchscreen or gesture-based keystroke entry, etc.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A method may comprise detecting a touch input by a user at a position on a virtual keyboard, applying a spatial model to map the touch input to one or more first candidate keys of the virtual keyboard, wherein the spatial model maps the touch input to the one or more first candidate keys based on a heatmap of prior touch inputs, applying a language model to map the touch input to one or more second candidate keys of the virtual keyboard, wherein the language model maps the touch input to the one or more second candidate keys based on comparing the position of the touch input to one or more predicted next keys, and selecting a particular key of the one or more first and second candidate keys as indicated by the touch input.

In some embodiments, the spatial model uses a first Gaussian distribution based on the heatmap of prior touch inputs near a key center to determine a global key center offset and the spatial model maps the touch input based on the global key center offset. In some embodiments, the method further comprises applying a key level center offset to the touch input based on a second Gaussian distribution, wherein the spatial model maps the touch input based on the key level center offset. In some embodiments, the spatial model provides one or more of a global level correction where all keys in a keyboard layout share one parameter, a cluster level correction where all the keys in a same cluster share one parameter, or a key level correction where each key has its own Gaussian parameters. In some embodiments, the method further comprises adjusting a visual appearance of at least a portion of the virtual keyboard based on the heatmap. In some embodiments, adjusting the visual appearance of at least the portion of the virtual keyboard includes adjusting the visual appearance of a spacebar to extend space at least above or below the spacebar. In some embodiments, the method further comprises determining one or more words that include a character that corresponds to the particular key and modifying the one or more words to add or remove a space based on the language model. In some embodiments, the method further comprises updating the heatmap is updated to discard prior touches that are older than a predetermined amount of time. In some embodiments, the method further comprises determining an identity of the user that provides the touch input, wherein the identity is determined based on authentication input provided by the user and retrieving the heatmap that corresponds to the user.

A computing device may comprise a processor and a memory, with instructions stored thereon that, when executed by the processor, cause the processor to perform operations comprising: detecting a touch input by a user at a position on a virtual keyboard, applying a spatial model to map the touch input to one or more first candidate keys of the virtual keyboard, wherein the spatial model maps the touch input to the one or more first candidate keys based on a heatmap of prior touch inputs, applying a language model to map the touch input to one or more second candidate keys of the virtual keyboard, wherein the language model maps the touch input to the one or more second candidate keys based on comparing the position of the touch input to one or more predicted next keys, and selecting a particular key of the one or more first and second candidate keys as indicated by the touch input.

In some embodiments, the spatial model uses a first Gaussian distribution based on the heatmap of prior touch inputs near a key center to determine a global key center offset and the spatial model maps the touch input based on the global key center offset. In some embodiments, the operations further comprise applying a key level center offset to the touch input based on a second Gaussian distribution, wherein the spatial model maps the touch input further based on the key level center offset. In some embodiments, the spatial model provides one or more of a global level correction where all keys in a keyboard layout share one parameter, a cluster level correction where all the keys in a same cluster share one parameter, or a key level correction where each key has its own Gaussian parameters. In some embodiments, the operations further comprise adjusting a visual appearance of at least a portion of the virtual keyboard based on the heatmap. In some embodiments, adjusting the visual appearance of at least the portion of the virtual keyboard includes adjusting the visual appearance of a spacebar to extend space at least above or below the spacebar.

A non-transitory computer-readable medium with instructions stored thereon that, when executed by one or more computers, may cause the one or more computers to perform operations, the operations comprising: detecting a touch input by a user at a position on a virtual keyboard, applying a spatial model to map the touch input to one or more first candidate keys of the virtual keyboard, wherein the spatial model maps the touch input to the one or more first candidate keys based on a heatmap of prior touch inputs, applying a language model to map the touch input to one or more second candidate keys of the virtual keyboard, wherein the language model maps the touch input to the one or more second candidate keys based on comparing the position of the touch input to one or more predicted next keys, and selecting a particular key of the one or more first and second candidate keys as indicated by the touch input.

In some embodiments, the spatial model uses a first Gaussian distribution based on the heatmap of prior touch inputs near a key center to determine a global key center offset and the spatial model maps the touch input based on the global key center offset. In some embodiments, the operations further comprise applying a key level center offset to the touch input based on a second Gaussian distribution, wherein the spatial model maps the touch input further based on the key level center offset. In some embodiments, the operations further comprise adjusting a visual appearance of at least a portion of the virtual keyboard based on the heatmap. In some embodiments, adjusting the visual appearance of at least the portion of the virtual keyboard includes adjusting the visual appearance of a spacebar to extend space at least above or below the spacebar.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

In some embodiments, a keyboard application (e.g., which may be part of a device operating system or a separate application) detects a touch input by a user at a position on a virtual keyboard. For example, after having entered "mor" the user touches a spot on the virtual keyboard in the vicinity of "b," "n," and the spacebar. The keyboard application applies a dynamic spatial model to map the touch input to one or more first candidate keys of the virtual keyboard. In this example, the spatial model maps the touch input to the one or more first candidate keys (e.g., "b," "n," and the spacebar) based on a heatmap of prior touch inputs by the user. The keyboard application applies a language model to map the touch input to one or more second candidate keys of the virtual keyboard. For example, according to the language model there is a 50% probability of the letter being entered as "n" since that corresponds to words such as "morning" that may occur commonly; a 20% probability of the letter being entered being "b" because that corresponds to "moral" or "moratorium" that may occur less frequently; a 10% probability of the letter being entered "b" because that corresponds to "morbid" and may be even less common; and a 0% probability of the letter being a space (corresponding to selection of the spacebar key) since "mor" is not a proper word (in the English language, as well as a user-specific dictionary, if such a dictionary is available). The keyboard application selects a particular key of the one or more first and second candidate keys as indicated by the touch input. For example, if the spatial model indicates a 70% likelihood that the touch input corresponds to the "n" key based on the touch position and the heatmap, and the language model indicates a 50% likelihood that the touch input corresponds to the "n" key based on word prediction, then the keyboard application selects "n" based on the combined result.

In some embodiments, the keyboard application modifies a portion of the virtual keyboard based on the heatmap. For example, if the keyboard application determines that the prior inputs and the touch input are above a default key center, the keyboard application may move a display of the portion of the virtual keyboard (e.g., the spacebar and/or other keys) to be higher. In another example, the keyboard application may not move the display but instead interpret touches received a predetermined number of pixels above the spacebar as corresponding to the spacebar.

Network Environment 100

Figure 1:
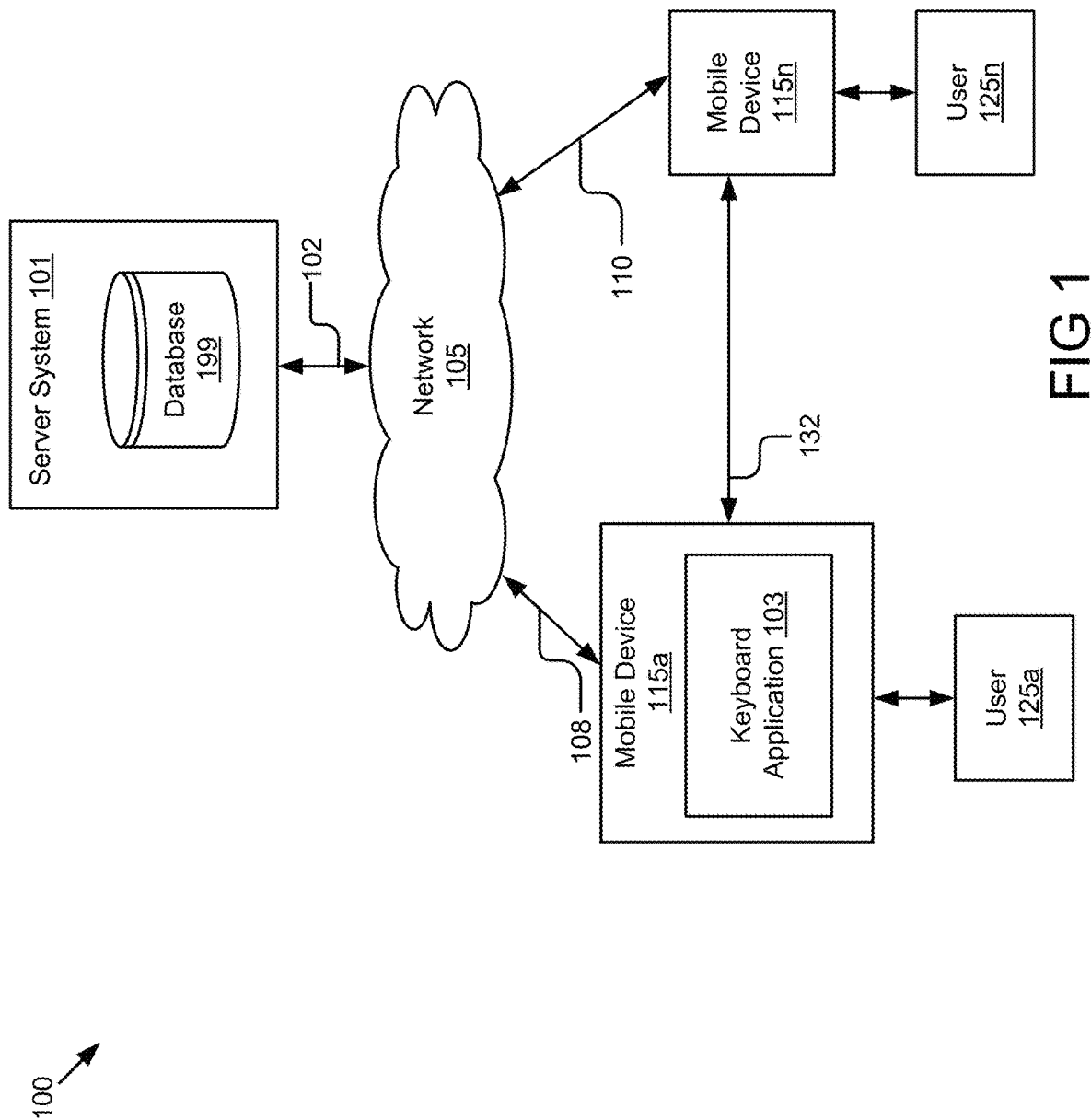
FIG. 1 is a block diagram of an example network environment, according to some embodiments described herein.

FIG. 1 illustrates a block diagram of an example network environment 100. In some embodiments, the network environment 100 can include one or more mobile devices, e.g., mobile devices 115a, 115n. Mobile device 115a can include a keyboard application 103. The keyboard application 103 may receive touch input from a user and select a particular key for display on a virtual keyboard based on a spatial model and a language model.

The mobile devices 115 can communicate with a network, such as network 105. Network 105 can be any type of communication network, including one or more of the Internet, local area networks (LAN), wireless networks, switch or hub connections, etc. In some embodiments, network 105 can include peer-to-peer communication between devices, e.g., using peer-to-peer wireless protocols (e.g., Bluetooth®, Wi-Fi Direct, Ultrawideband, etc.), etc. One example of peer-to-peer communications between two mobile devices 115a and 115b is shown by arrow 132.

The network environment 100 may also include one or more server systems, e.g., server system 101 in the example of FIG. 1. Server system 101 can include a database 199 or other storage device. In some embodiments, the server system 101 may send updates for the keyboard application 103 to the mobile devices 115.

For ease of illustration, FIG. 1 shows one block for server system 101 and database 199, and shows two blocks for mobile devices 115a and 115n. Server blocks 101 and 199 may represent multiple systems, server devices, and network databases, and the blocks can be provided in different configurations than shown. For example, server system 101 can represent multiple server systems that can communicate with other server systems via the network 105. In some embodiments, server system 101 can include cloud hosting servers, for example. In some examples, database 199 and/or other storage devices can be provided in server system block(s) that are separate from server system 101 and can communicate with server system 101 and other server systems via network 105.

There may be any number of mobile devices 115. Each mobile device 115 can be any type of electronic device, e.g., portable device, cell phone, smartphone, tablet computer, camera, smart display, wearable devices (e.g., display glasses or goggles, wristwatch, headset, armband, jewelry, etc.), personal digital assistant (PDA), media player, game device, etc. that uses a virtual keyboard. The mobile devices 115 may also include a local database similar to database 199 or other storage. In some embodiments, network environment 100 may not have all of the components shown and/or may have other elements including other types of elements instead of, or in addition to, those described herein.

In various embodiments, users 125 may communicate with server system 101 and/or each other using respective mobile devices 115a, 115n. In some examples, users 125 may interact with each other via the keyboard application 103 running on respective mobile devices 115 and/or server system 101 via a network service, e.g., a messaging application, a social network service, an image hosting service, or other type of network service, implemented on server system 101. For example, respective mobile devices 115a, 115n may communicate data to and from one or more server systems, e.g., server system 101.

In some embodiments, the server system 101 may provide appropriate data, such as keyboard application 103 updates, to the mobile devices 115a, 115n such that each mobile device 115 can receive communicated content or shared content uploaded to the server system 101 and/or network service.

Example Computing Device 200

Figure 2:
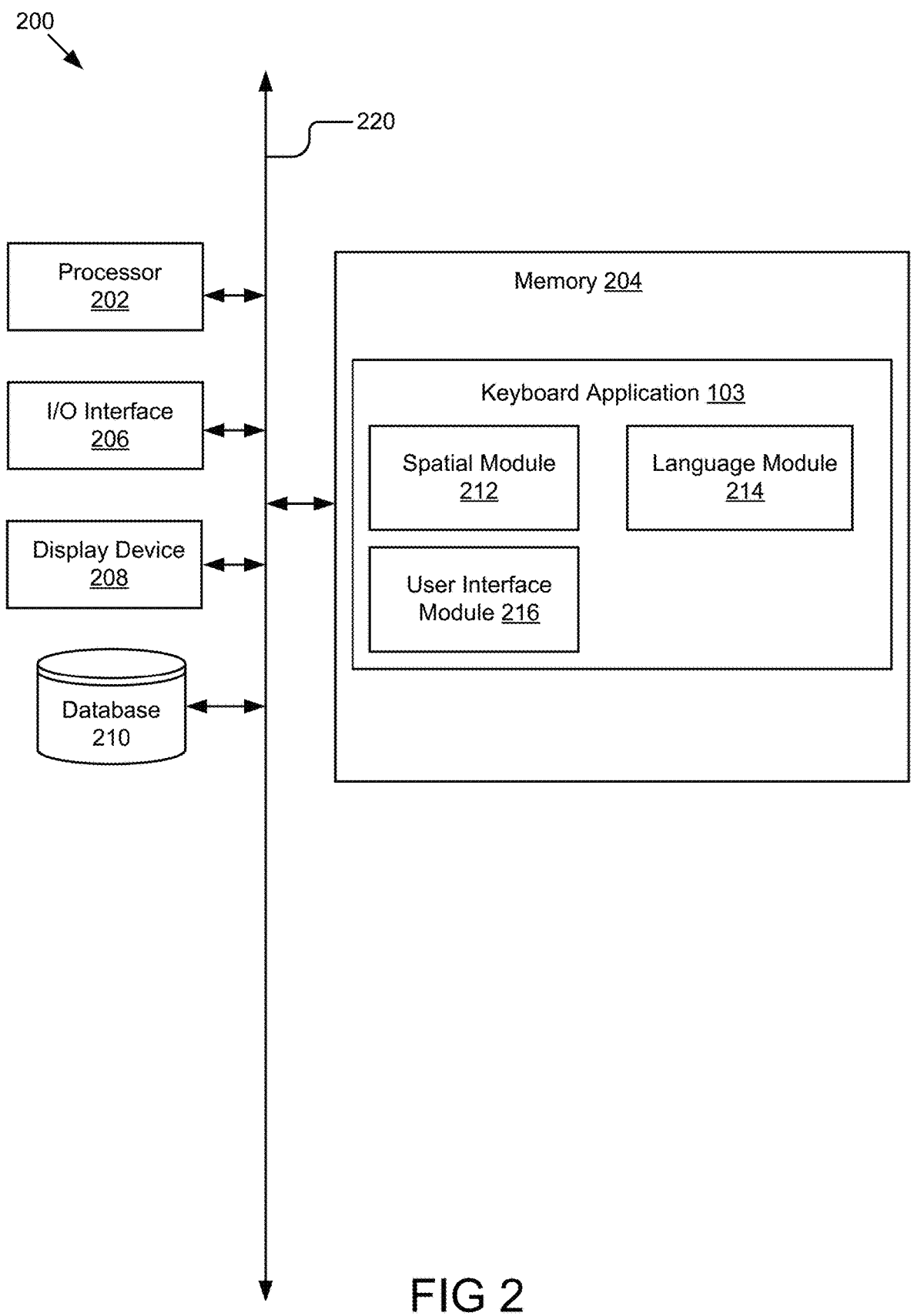
FIG. 2 is a block diagram of an example computing device, according to some embodiments described herein.

FIG. 2 is a block diagram of an example computing device 200 which may be used to implement one or more features described herein. In one example, computing device 200 may be a mobile device 115 used to implement the keyboard application 103 computing device 200 Computing device 200 can be any suitable computer system, server, or other electronic or hardware device as described above.

One or more methods described herein can be run in a standalone program that can be executed on any type of computing device, a program run on a web browser, a mobile application ("app") run on a mobile computing device (e.g., cell phone, smart phone, smart display, tablet computer, wearable device (wristwatch, armband, jewelry, headwear, virtual reality goggles or glasses, augmented reality goggles or glasses, head mounted display, etc.), laptop computer, etc.). In the primary example, all computations are performed within the mobile application (and/or other applications) on the mobile computing device. However, it is also possible to use a client/server architecture, e.g., a mobile computing device sends user input data to a server device and receives from the server the final output data for output (e.g., for display). In another example, computations can be split between the mobile computing device and one or more server devices.

In some embodiments, computing device 200 includes a processor 202, a memory 204, an input/output (I/O) interface 206, a display device 208, and a database 210. Processor 202, memory 204, I/O interface 206, display device 208, and database 210 may be coupled via a bus 220.

Processor 202 can be one or more processors and/or processing circuits to execute program code and control basic operations of the computing device 200. A "processor" includes any suitable hardware system, mechanism or component that processes data, signals or other information. A processor may include a system with a general-purpose central processing unit (CPU) with one or more cores (e.g., in a single-core, dual-core, or multi-core configuration), multiple processing units (e.g., in a multiprocessor configuration), a graphics processing unit (GPU), a field-programmable gate array (FPGA), an application-specific integrated circuit (ASIC), a complex programmable logic device (CPLD), dedicated circuitry for achieving functionality, a special-purpose processor to implement neural network model-based processing, neural circuits, processors optimized for matrix computations (e.g., matrix multiplication), or other systems. In some embodiments, processor 202 may include one or more co-processors that implement neural-network processing. In some embodiments, processor 202 may be a processor that processes data to produce probabilistic output, e.g., the output produced by processor 202 may be imprecise or may be accurate within a range from an expected output. Processing need not be limited to a particular geographic location or have temporal limitations. For example, a processor may perform its functions in real-time, offline, in a batch mode, etc. Portions of processing may be performed at different times and at different locations, by different (or the same) processing systems. A computer may be any processor in communication with a memory.

Memory 204 is typically provided in computing device 200 for access by the processor 202, and may be any suitable processor-readable storage medium, such as random access memory (RAM), read-only memory (ROM), Electrical Erasable Read-only Memory (EEPROM), Flash memory, etc., suitable for storing instructions for execution by the processor or sets of processors, and located separate from processor 202 and/or integrated therewith. Memory 204 can store software operating on the computing device 200 by the processor 202, including a keyboard application 103.

I/O interface 206 can provide functions to enable interfacing the computing device 200 with other systems and devices. Interfaced devices can be included as part of the computing device 200 or can be separate and communicate with the computing device 200. For example, network communication devices, storage devices (e.g., memory and/or database 199), and input/output devices can communicate via I/O interface 206. In some embodiments, the I/O interface can connect to interface devices such as input devices (keyboard, pointing device, touchscreen, microphone, camera, scanner, sensors, etc.) and/or output devices (display devices, speaker devices, printers, motors, etc.). For example, when a user provides touch input, I/O interface 206 transmits the data to the keyboard application 103.

Some examples of interfaced devices that can connect to I/O interface 206 can include one or more display devices 208 that can be used to display content, e.g., images, video, and/or a user interface of an output application as described herein, and to receive touch (or gesture) input from a user. For example, display device 208 may be utilized display an on-screen virtual keyboard. Display device 208 may include touch detection capability (e.g., via resistive, capacitive, or other circuitry that can detect touch). For example, display device 208 may detect when a user touches or brings their finger or a stylus close to particular regions of the display device 208, e.g., individual pixels of the display device, clusters of pixels of the display device, etc. Display device 208 can be connected to computing device 200 via local connections (e.g., display bus) and/or via networked connections and can be any suitable display device. Display device 208 can include any suitable display device such as a liquid crystal display (LCD), light emitting diode (LED), or plasma display screen, cathode ray tube (CRT), television, monitor, touchscreen, three-dimensional display screen, or other visual display device. For example, display device 208 can be a flat display screen provided on a mobile device, multiple display screens embedded in a glasses form factor or headset device, or a monitor screen for a computer device.

In some implementations, display device 208 may act directly as an input device, e.g., when the touch capability is integrated into display device 208, e.g., a touchscreen display. In some implementations, a touch recognition layer separate from display device 208 may be provided in computing device 200. In these implementations, the touch recognition layer may be part of I/O interface 206 and may detect touch positions, e.g., while display device 208 displays a virtual keyboard or other content. For the purposes of this document, it is presumed that computing device 200 includes hardware touch detection capability whereby touch input provided by a user is detected and mapped to specific positions of a virtual keyboard displayed on display device 208.

The database 210 stores data related to the keyboard application 103. For example, the database 210 may store a heatmap of prior touches from a user, a user-specific personal dictionary, etc. In some embodiments, the heatmap is updated to discard prior touches that are older than a predetermined amount of time (e.g., most recent 24 hours, most recent week, most recent hour, etc.).

Keyboard Application 103

The keyboard application 103 may include a spatial module 212, a language module 214, and a user interface module 216.

The spatial module 212 applies a dynamic spatial model to map touch input to one or more candidate keys of a virtual keyboard. In some embodiments, the spatial module 212 includes a set of instructions executable by the processor 202 to map the touch input to one or more candidate keys of the virtual keyboard. In some embodiments, the spatial module 212 is stored in the memory 204 of the computing device 200 and can be accessible and executable by the processor 202.

In some embodiments, the spatial module 212 receives touch input from a user via the I/O interface 206 and/or display device 208. The spatial module 212 may generate a heatmap from the touch inputs. In some embodiments, the spatial module 212 generates a heatmap based on a fixed period of time, such as the most recent 24 hours, most recent week, etc. Maintaining a recent heatmap may advantageously account for changes to patterns in a user's touch input, such as for when the user changes a case or cover for the mobile device, grips the phone differently, holds the phone differently (e.g., in portrait or landscape orientation), develops a hand injury, or otherwise changes the pattern of input, etc. The spatial module 212 may store the heatmap in the database 210. In some embodiments, where there is insufficient data to generate a heatmap of prior touch inputs by the user, the spatial module 212 may use a default heatmap as a starting point.

In some embodiments, multiple users may use the same mobile device 115. The spatial module 212 may generate multiple heatmaps for the mobile device 115 and retrieve a heatmap for a user based on the heatmap corresponding to a particular user. The spatial module 212 may determine an identity of the user that provides the touch input based on authentication input provided by the user, such as biometric data (e.g., fingerprint, camera identification, etc.), a password, a pass pattern, etc. The authentication input is used for authentication purposes only, if specifically enabled by the user, and is not used for the purposes of touch input. Users are provided with options to enable or disable specific types of authentication, e.g., users can turn off biometric authentication completely. Authentication is performed locally on-device and no user identifiable data is transmitted to any other device.

In some embodiments, the spatial module 212 maps the touch input to one or more first candidate keys based on a heatmap of prior touch inputs by the user. For example, if the heatmap indicates that the user consistently taps on the center on each of the keys, the spatial module 212 maps the touch input to the center of a candidate key (i.e., the default key center). In another example, if the heatmap indicates that the user consistently taps up and to the left of the keys on the virtual keyboard, the spatial module 212 may map the touch input to correspond to keys that are down and to the right of the touch input. The spatial module 212 may retrieve the heatmap for the user based on the user identified as accessing computing device 200. The heatmap may indicate different offsets from tapping positions for different keys, e.g., different offsets from key centers for the left and right portions of the virtual keyboard (that may be accessed with different fingers of different hands), different offsets for different rows (e.g., that may be at different distances from the user's fingers as the user grips a device and types on a virtual keyboard), or different offsets for individual keys. In some embodiments, the spatial module 212 performs adjustments based on the heatmap as described below.

Figure 3A:
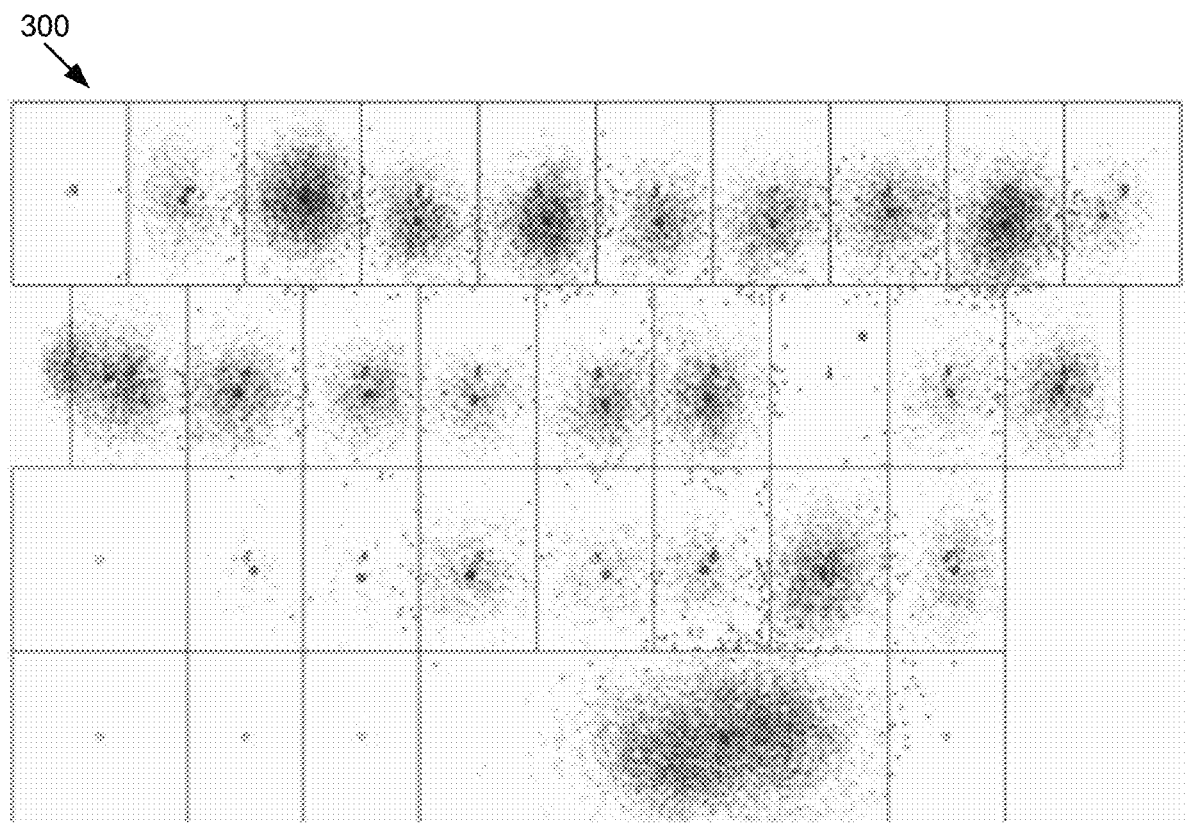
FIG. 3A is an example illustration of a heatmap generated from touch inputs on a virtual keyboard, according to some embodiments described herein.

The spatial module 212 may be used to identify a position of an actual key center specific for the user and how it differs from a position of a default key center in order to determine a difference between the locations. For example, FIG. 3A is an example illustration 300 of a heatmap generated from prior touch inputs on a virtual keyboard, obtained from volunteer users during test data entry sessions. In this example, the touch input data was obtained from 50 volunteer users that each entered 50 sentences. The illustration 300 includes the distribution of all 50 users' touch inputs on 2,500 sentences (about 12,000 words) on a virtual keyboard. The gray points represent users' actual touch inputs, the red points represent the default key center (i.e., the key center from the keyboard layout), the blue points represent the key center computed from the users' touch inputs, and the green points represent touch inputs that triggered key correction (the users made a correction since the wrong key was interpreted by the virtual keyboard). As can be seen, the green points occur near the edges of keys. FIG. 3A demonstrates that the volunteers users in this dataset tended to tap lower than the default key center, especially for keys on the first row of the virtual keyboard.

While FIG. 3A shows a particular type of heatmap, generated from aggregate data obtained from multiple volunteer users, it will be appreciated that different users may have different touch patterns and corresponding offset points at which they touch different keys. In actual use, as described further below, the spatial module 212 can generate a heatmap locally on-device for each user as the users use an on-screen virtual keyboard, and engage in correction activity when necessary. Over time, as the user enters text using the virtual keyboard, the heatmap is representative of the user's pattern of touch input, e.g., that the user touches the "a" key closer to its border with the "s" key, the user touches spacebar towards the top, closer to its border with the "c" "v" "b" and "n" keys, etc.

Figure 3B:
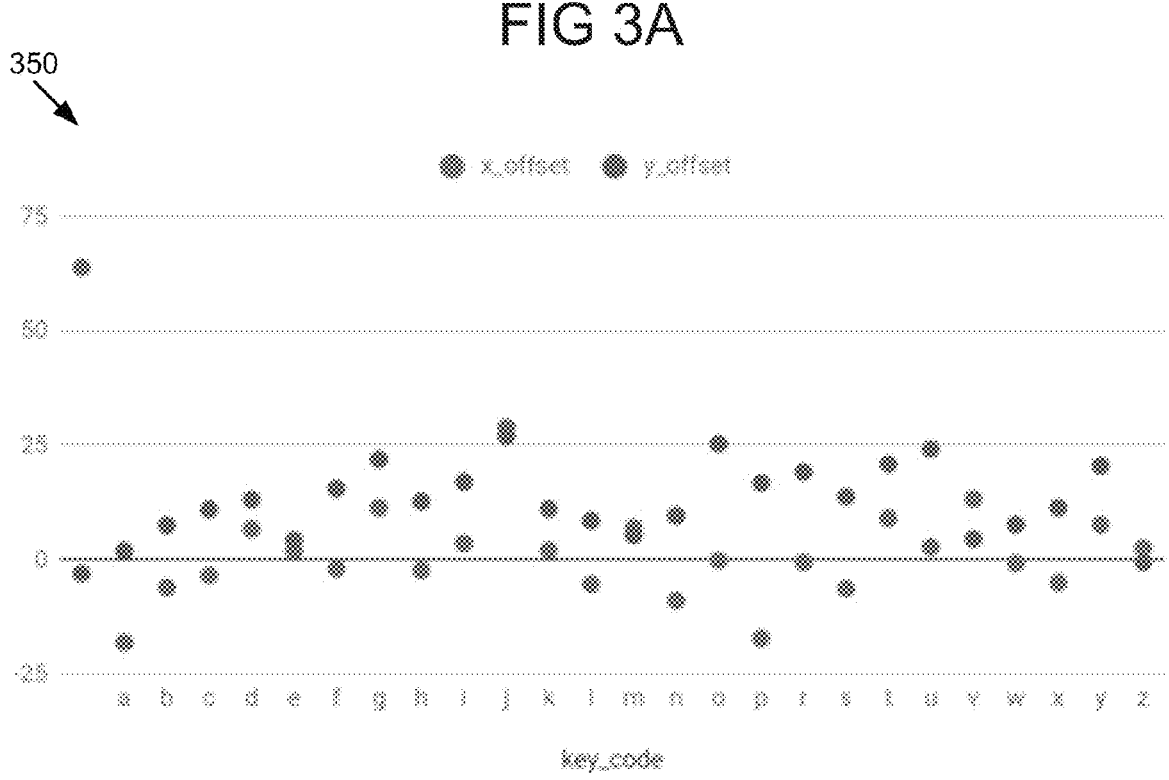
FIG. 3B is an example illustration of a key center offset for each key that is determined based on the heatmap illustrated in FIG. 3A, according to some embodiments described herein.

FIG. 3B is an example illustration 350 of a key center offset that is measured as a distance between the touch input to the geometric key center (in unit pixels) for each key that is determined based on the heatmap illustrated in FIG. 3A according to some embodiments described herein. In this example, the offset for the x-axis (x_offset) is illustrated in blue and the offset for the y-axis (y_offset) is illustrated in red. The leftmost data point is the offset for the spacebar. Next are the keys for the English alphabet. The illustration shows that certain letters have a more dramatic offset than others. For example, the letter "j" has the highest x_offset and y_offset.

In some embodiments, the spatial module 212 generates a dynamic spatial model by determining a key offset between the default key center of the virtual keyboard and an actual key center as indicated by the touch inputs of the user and making dynamic modifications based on the key offset. In some embodiments, the spatial model uses a Gaussian distribution. In some embodiments, the spatial module 212 maintains a different spatial model for different keyboard layouts.

The following definitions will be used in the equations below: x, y are coordinates of the touch input and the unit is pixel (pixel coordinate); key is a user expected tapped key; $key_{actual}$ is the actual key center position of a tapped key from the virtual keyboard; $d(x, y, key_{default})$ is a difference from a user actual touch input to a default key center of key, which is a vector; $d(x,y,key_{actual})$ is a difference from the user actual touch input to the actual key center; $d(key_{actual}, key_{default})$ is a key center offset and is defined as a difference from the user actual key center to the default key center; $\sigma_d$ is a standard of current Gaussian distribution of the spatial model; and $E[d(\ )]$ is the expectation of one specific distance.

In one embodiment, the spatial module 212 determines an align score using the following equation:

$$\text{AlignScore}(x,y,\text{key}) = d^2(x,y,\text{key}_{default})/\sigma_d^2 \quad \text{Eq. 1}$$

The difference from the touch input to the default key center can be treated as a sum of the touch input to the actual key center and actual key center to the default key center as defined by the equation below:

$$d(x,y,\text{key}_{default}) = d(x,y,\text{key}_{actual}) + d(\text{key}_{actual},\text{key}_{default}) \quad \text{Eq. 2}$$

The distribution of touch inputs of one specific key is around the actual key center, which is defined as follows:

$$E[d(x,y,\text{key}_{actual})] = 0 \quad \text{Eq. 3}$$

So that:

$$E[d(x,y,\text{key}_{default})] = E[d(x,y,\text{key}_{actual})] = E[d(\text{key}_{actual}, \text{key}_{default})] = d(\text{key}_{actual},\text{key}_{default}) \quad \text{Eq. 4}$$

To yield the following equation:

$$\text{keyoffset} = d(\text{key}_{actual},\text{key}_{default}) = E[d(x,y,\text{key}_{default})] \quad \text{Eq. 5}$$

The above equation for the key offset reveals that the spatial module 212 predicts the key center offset from the default key center and touch input from a user. In some embodiments, this is an unsupervised algorithm without complex learning and computations, which means that machine learning is not part of the spatial module 212. In some embodiments, the spatial module 212 adds the key center offset to the default key center with a weight to obtain a personalized key center:

$$\text{keycenter}_{personalized} = \text{key}_{default} + \text{weight}*d(\text{key}_{actual}, \text{key}_{default}) \quad \text{Eq. 6}$$

The spatial module 212 may determine the key offset for each key (including the spacebar). The key offset may be caused by a user's finger error, such as when a finger is wider than the touching area; a user's position/perspective when typing; and a user's typing habit, such as left, right, one hand, or both hands. In some embodiments, the spatial module 212 maps the touch input to candidate keys of the virtual keyboard based on the key offset. For example, where a touch input is closer to "e" than "d," the spatial module 212 may determine that the candidate key is "d" based on the actual key center position being higher than the default key center. In some embodiments, the spatial module 212 adjusts a position of at least a portion of the virtual keyboard based on the spatial model. For example, continuing with the previous example, the spatial module 212 may instruct the user interface module 216 to adjust the position of the "d" key to be higher on the virtual keyboard (e.g., by interpreting touches for a predetermined number of pixels above the "d" key as indicating the "d" key rather than the actual key above that may be touched, e.g., "e" or "r") to reduce the key offset.

Typing errors due to position and visual angle of the virtual keyboard typically remain constant while typing a word. As a result, the spatial module 212 applies word-level learning by using the key center offset as a constant for word prediction because it is unlikely that the key center offset will change between letters. The spatial module 212 determines the key offset for a first part of a word and then predicts a second part of the world. For example, if the user is typing "internationalization," and already types "internation" when computing the spatial score for the letter "a," the spatial module 212 determines the key center offset based on the touch inputs of "internation" applies the key center offset to the key center of the spatial model; and computes the personalized spatial score.

In some embodiments, the spatial module 212 uses one or more of the following factors in the spatial model: a key center sample size that specifies a minimum number of touch inputs to be learned, a tap key center offset weight that is the weight of the key center offset that is applied to the key center for tap typing, and a gesture key center offset weight that is the weight of the key center offset applied to the key center for gesture typing.

In some embodiments, instead of performing word-level learning, the spatial module 212 performs in-memory learning. This addresses defects in world-level learning where the length of the word is too short and instances where noise influences the personalized key center enough to cause inaccuracy. The spatial module 212 performs in-memory learning by keeping the user history (with specific permission from the user for such secure in-memory storage) in a cache stored in the database 210. More specifically, when the user starts typing a word the spatial module 212 retrieves a key center offset from the in-memory history, applies the key center offset to the key center, calculates the spatial score, and updates the in-memory history. In some embodiments, the spatial module 212 uses the following factors in the spatial model: a key center sample size that specifies a minimum number of touch inputs to be learned and a tap key center offset weight that is the weight of the key center offset that is applied to the key center for tap typing.

In some embodiments, the spatial module 212 performs a key correction for a spacebar of the virtual keyboard by changing the interpretation of touch inputs for the spacebar. For example, even when a user provides a touch input that is not directly on the spacebar, the spatial module 212 may interpret it as corresponding to a touch of the spacebar. The spatial module 212 may use a Gaussian distribution to determine how to perform the key correction.

In some embodiments, the spatial module 212 determines the distribution of touch inputs using a Gaussian distribution around the key center of the spatial model. For example, the spatial module 212 may use a Gaussian model param function with the following parameters: an offset at an x-axis, an offset at a y-axis, a variance at the x-axis, a variance at the y-axis (where, if this is missed the variance at the x-axis is used), covariance of the distributions in two dimensions where the default is to treat the distributions as independent distributions, and a total amount of data points. Based on the definition of the of the Gaussian parameters, the spatial module 212 maintains the following different levels of personalized parameters: a global level key correction based on a global key center offset where all the keys in the keyboard layout share one parameter, a cluster level correction of a cluster key center offset where all the keys in a same cluster share one parameter, and a key level correction of a key level center offset where each key has its own Gaussian parameters.

In some embodiments, the spatial module 212 generates a separate spatial model for the key correction in addition to the spatial model used for a global key center offset. This way, the spatial module 212 accounts for predictions that occur before a space is input and after a space is input. For example, the spatial module 212 uses a first spatial module to make a word prediction before the end of a word, e.g., "mornin" has a key prediction of "g" and even if the user types "h" (which is immediately to the right of "g" on the virtual keyboard) the spatial module 212 selects the letter "g." The spatial module 212 uses a second spatial module to make a word prediction once the entire word has been written, e.g., the spatial module 212 turns the written word "jappy" into "happy."

The spatial module 212 may maintain different spatial models for the same user. For example, different spatial models may be associated with different device orientations such as portrait or landscape. Further, different on-device spatial models may be maintained for different users, with permission of the respective users, if a device is utilized by multiple users. The generation, storage, and/or use of a user-specific heatmap, spatial model, and/or determination of candidate keys based on touch input is performed with specific user permission. Each user is provided with options to enable or disable such personalization. For example, the user may be presented with a menu that indicates clearly the type of information (e.g., prior touch history) that may be utilized and the benefits of personalization (e.g., reduced typing errors and faster data entry). Users are provided with options to enable/disable personalization at any time. User data such as prior touch inputs, and derived information such as a heatmap or spatial model, is stored locally on-device and is utilized specifically for the purpose of enhancing data entry via a virtual keyboard. Such information is discarded if the user disables the personalization and/or chooses to delete the data. No information regarding the user's data entry using a virtual keyboard is accessed or stored if the user disables the personalization features. The spatial module 212 operates entirely on-device.

Figure 4:
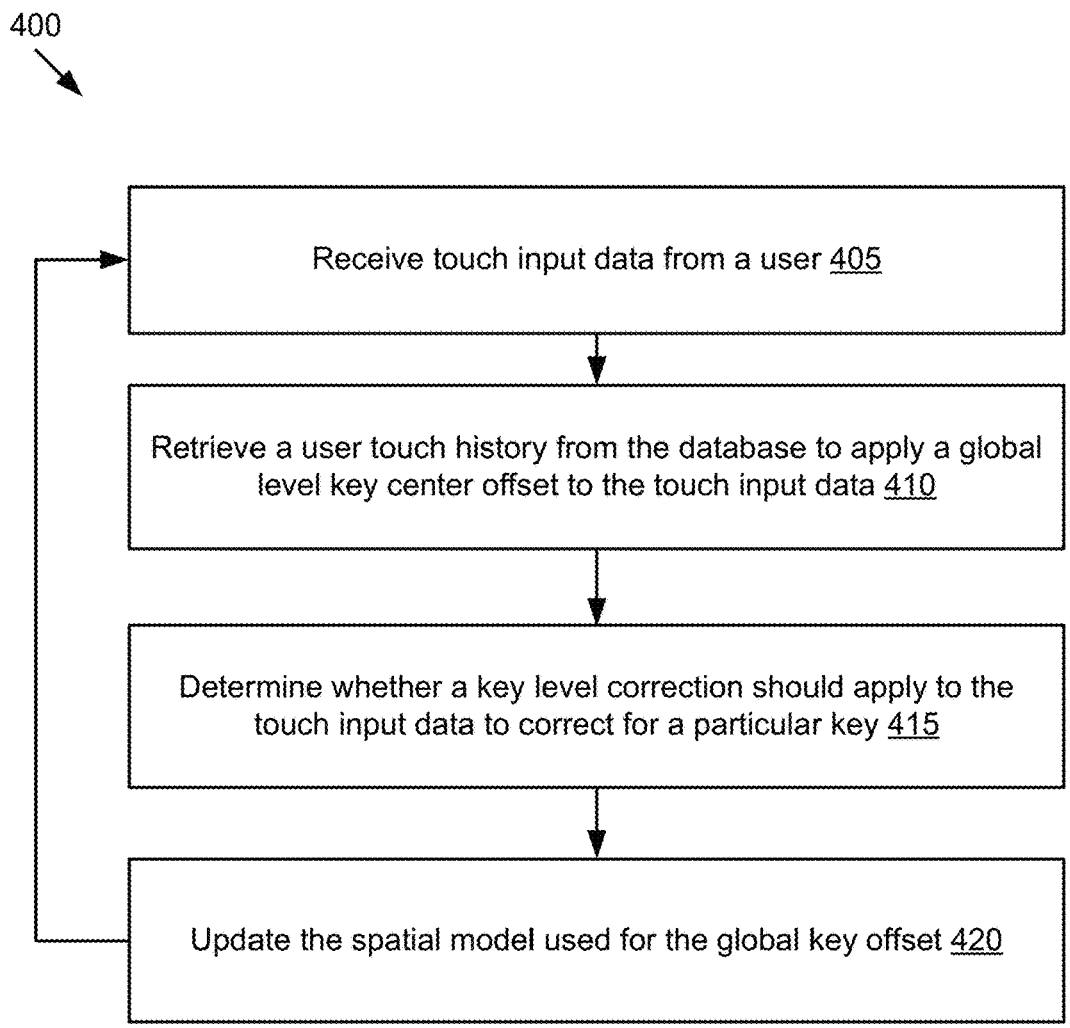
FIG. 4 is a flowchart of an example method for applying key correction to keys of a virtual keyboard, according to some embodiments described herein.

FIG. 4 is a flowchart of an example method 400 for applying key correction to each key in a virtual keyboard according to some embodiments described herein. In this example the spatial module 212 receives 405 touch input data from a user, retrieves 410 a user touch history from the database 210 to apply a global level key center offset to the touch input data, determines 415 whether a key level correction (KC) should apply to the touch input data to correct for a particular key, and updates 420 the spatial model used for a global key center offset.

For this embodiment, the spatial module 212 does not apply the key level correction when certain preconditions are met. For example, the spatial module 212 does not apply the key level correction if the sample size (e.g., the word being typed) falls below a predetermined threshold, the spatial module 212 applies a learning weight of key center offset to the touch input, or the spatial module 212 applies a learning weight of key center variance to the touch input. In some embodiments, although the spacebar is a key, the spatial module 212 applies different rules to the spacebar because it has a larger x range. For example, the spatial module 212 may not update spatial model used for the global key offset for touch inputs corresponding to the spacebar because the rules are different than for letter keys. The method 400 may repeat as additional touch input data is received.

Figure 5A:
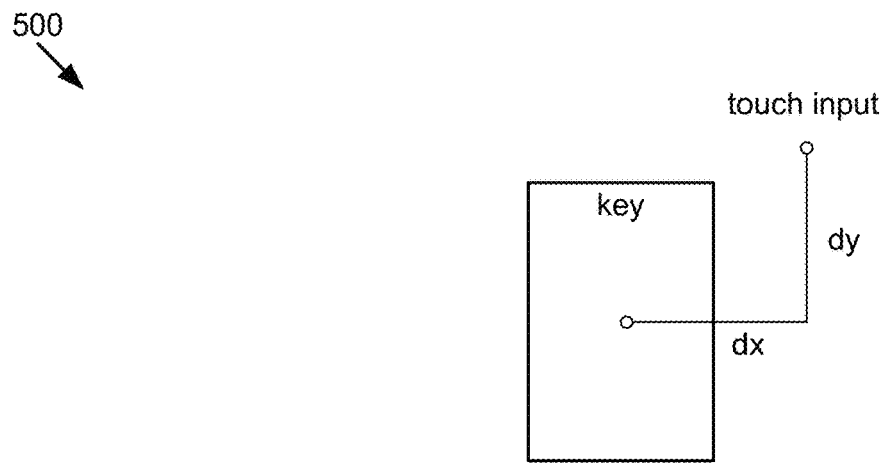
FIG. 5A is an example illustration of a difference in x-dimension and a difference in y-dimension between a center of a key on the virtual keyboard and touch input from a user.
Figure 5B:
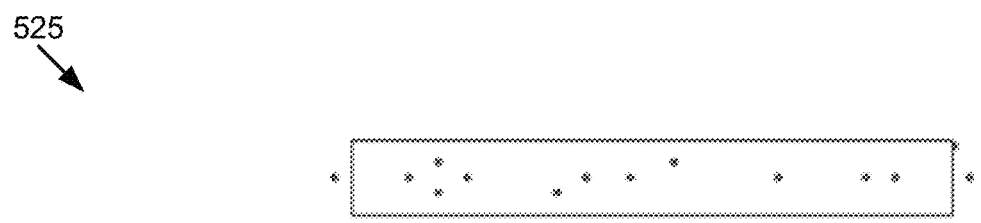
FIG. 5B is an example illustration of touch inputs for a spacebar on a virtual keyboard.

In some embodiments, the spatial module 212 uses a Gaussian distribution as part of the key level correction to generate a spatial score. FIG. 5A is an illustration 500 of how the spatial module 212 determines a difference in x-dimension (dx) and a difference in y-dimension (dy) between a center of a key on the virtual keyboard and touch inputs from a user according to some embodiments. For keys where the width or height of the key (e.g., the spacebar) is larger than common keys (e.g., "n"), users may not touch in the center of the key. For example, FIG. 5B is an illustration 525 of touch inputs for a spacebar, which shows that in addition to not touching in the center of the spacebar, some users even touch outside of the spacebar.

In some embodiments, the spatial module 212 determines the bound of the keys using the following equations:

$$x\_lower\_bound = center\_x - key\_width/2 + common\_key\_width/2 \qquad \text{Eq. 7}$$

$$x\_upper\_bound = center\_x + key\_width/2 - common\_key\_width/2 \qquad \text{Eq. 8}$$

$$y\_lower\_bound = center\_y - key\_height/2 + common\_key\_height/2 \qquad \text{Eq. 9}$$

$$y\_upper\_bound = center\_y + key\_height/2 - common\_key\_height/2 \qquad \text{Eq. 10}$$

Figure 5C:
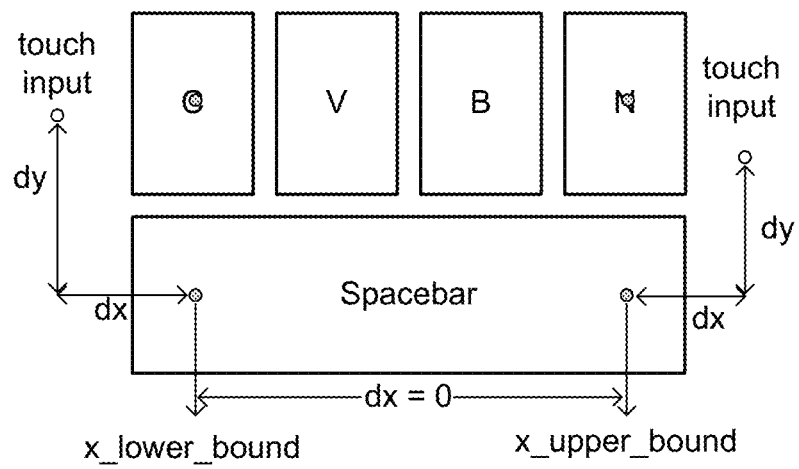
FIG. 5C is an example illustration of calculation of a change in x-dimension and a change in y-dimension for touch inputs with reference to the spacebar, according to some embodiments described herein.

FIG. 5C is an example illustration 550 of how to calculate a change in x-dimension (dx) and a change in y-dimension (dy) for touch inputs with reference to the spacebar. FIG. 5C illustrates the default key centers for the C key, the N key, and the spacebar as gray circles. FIG. 5C illustrates the touch inputs as open circles. As illustrated in FIG. 5C, the x_lower_bound of the spacebar is the same value as the center x of key "C" and the x_upper_bound of the spacebar is the same value as the center x of key "N."

For keys whose width is larger than common keys (e.g., for the spacebar), the spatial module 212 determines dx using the following equations:

If touch_x>x_lower_bound &
    touch_x<x_upper_bound, then $dx=0$     Eq. 11

If touch_x<x_lower_boun, then $dx=x\_lower\_bound-touch\_x$     Eq. 12

If touch_x>x_upper_bound, then $dx=touch\_x-x\_upper\_bound$     Eq. 13

For keys whose height is larger than common keys, the spatial module 212 determines dy using equations similar to equations 11-13, but with y substituted for x.

Figure 5D:
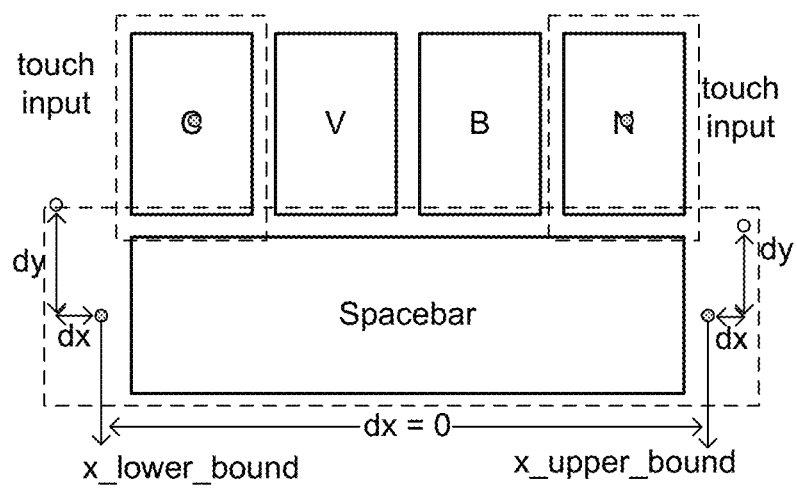
FIG. 5D is an illustration of another example of a Gaussian distribution used by the spatial model to increase a number of touch inputs that are mapped to the spacebar, according to some embodiments described herein.

In some embodiments, the spatial module 212 uses an expanded version of the Gaussian distribution as part of the key level correction to generate a spatial score. FIG. 5D is an illustration 575 of a Gaussian distribution used by the spatial model that has additional overlap between the C and N keys and the spacebar on the virtual keyboard. In this example, the spatial module 212 uses a gaussian_target_size factor with a value of 1.5 as illustrated by the dashed lines in FIG. 5D. The spatial module 212 multiples the width and height of all keys by the gaussian_target_size factor and also multiplies the common key width and common key height by the gaussian_target_size factor. As a result, touch inputs that are between the "C" key and the spacebar or the "N" key and the spacebar may map the touch input to candidate keys "C" and spacebar or "N" and the spacebar instead of with a less expansive Gaussian distribution that has less overlap and so the spatial module 212 would map the touch input to either candidate keys "C" or the spacebar or candidate keys "N" or the spacebar.

Continuing with FIG. 5D, the spatial module 212 obtains the error x_lower_bound and x_upper_bound for the spacebar by multiplying the width and height of all keys by the gaussian_target_size factor. Because the x_lower_bound of the spacebar is smaller than the center x of key C and the x_upper_bound of the spacebar is larger than the center x of key N, the dx results in the spatial module 212 associating a larger spatial score to the spacebar than from using a Gaussian distribution without the gaussian_target_size factor.

In some embodiments, the spatial module 212 performs a key correction for keys of the virtual keyboard by adjusting the visual appearance of at least the portion of the virtual keyboard. For example, the spatial module 212 moves a position of the entire virtual keyboard to reduce the key offsets, such as by making the virtual keyboard display more closely to the position of the keys as indicated by the heatmap. In another example, the spatial module 212 modifies a visual appearance of particular keys based on the heatmap. For example, the spatial module 212 may determine based on the heatmap that the key offset for the key "N" is the greatest of all the letter keys and, as a result, increases a size of the boundaries of the key "N" on the virtual keyboard (touches within which may be mapped to the "N" key by the spatial module 212).

In some embodiments, the spatial module 212 adjusts the visual appearance for the spacebar. For example, in some embodiments where the spatial module 212 determines, based on a heatmap, that touch input is supposed to correspond to the space bar, but the touch input is outside the spacebar, the spatial module 212 instructs the user interface module 216 to generate a user interface in which the visual appearance of the spacebar is adjusted based on a heatmap of the touch inputs. The spatial module 212 may instruct the user interface module 216 to modify the display by raising the keyboard position (e.g., by a few pixels, e.g., about half a space bar height), extending the clickable area of the spacebar until it reaches a system navigation bar (if in use) or other UI elements, extending the space bar clickable area below the spacebar (e.g., by about half a space bar height), or raising the keyboard position to a height determined based on a history of touch inputs from the user. In some embodiments, the spatial module 212 may instruct the user interface module 216 to generate a user interface in which the visual appearance of the spacebar is adjusted by changing the boundaries of the spacebar.

Figure 6A:
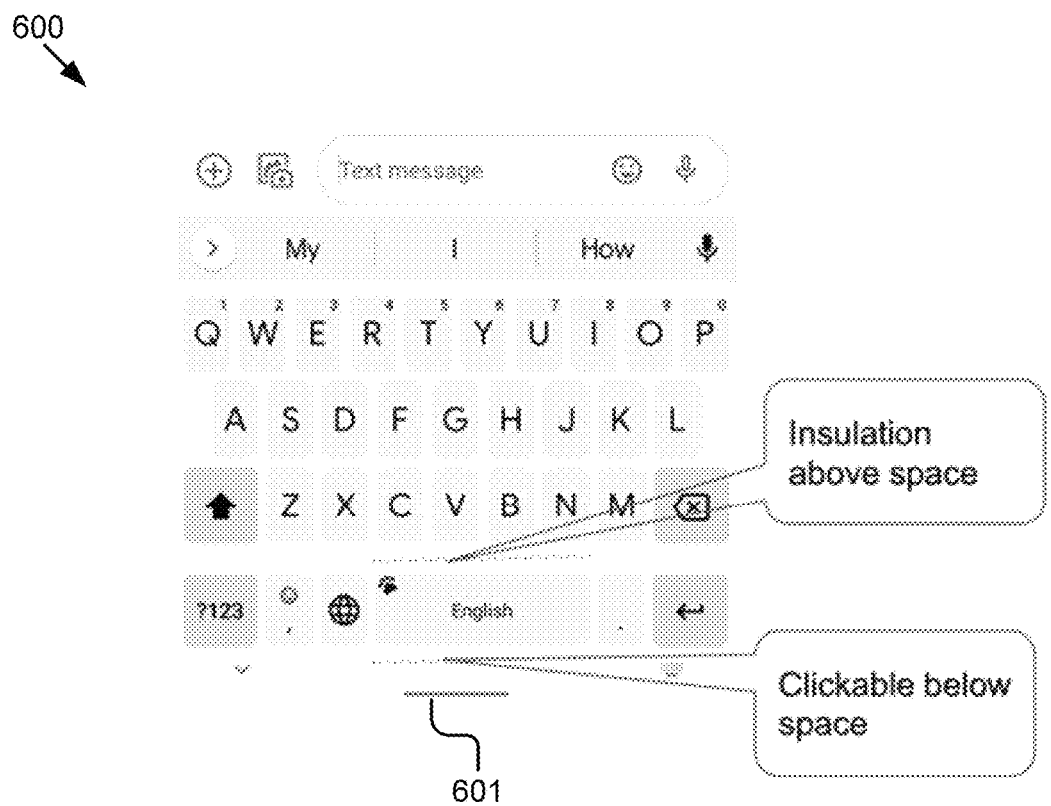
FIG. 6A is an example illustration of two different ways to modify a position of the spacebar, according to some embodiments described herein.

FIG. 6A is an example illustration 600 of two different ways to modify a position of the spacebar according to some embodiments described herein. In this example, touch inputs that are received in the insulation above the space and the clickable space from below the spacebar until the system navigation bar 601 are still considered to correspond to selection of the spacebar. In some embodiments, the spatial module 212 modifies a visual appearance of the spacebar or modifies a mapping of the touch input with more pixels to correspond to the spacebar.

Figure 6B:
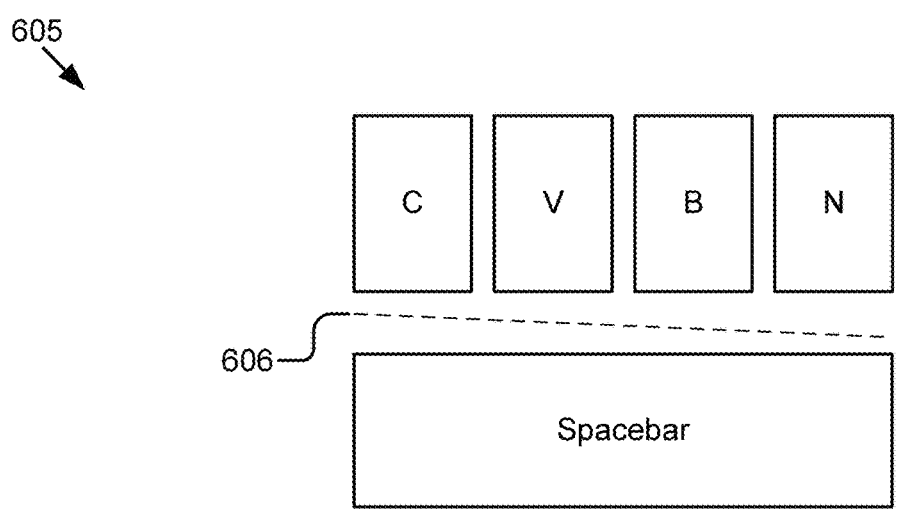
FIG. 6B is an example illustration of a virtual keyboard where the heatmap indicates that touch inputs from the user for the spacebar are at an angle.

FIG. 6B is an example illustration 605 of a virtual keyboard where the heatmap indicates that touch inputs from the user for the spacebar are at an angle. For example, if the user tends to touch higher than the top of the spacebar key on the left near the "C" key, and progressively lower towards the right with the lowest point being just above the spacebar near the "N" key. In this example, the heatmap for the spacebar key is represented by the dashed angled line 606. This could occur, for example, where a user types primarily with their right hand and the thumb provides touch inputs at a higher angle than the other fingers. In some embodiments, the spatial module 212 uses a heatmap that includes touch inputs at a higher angle to detect touch inputs in an overlapping region and uses the spatial model to interpret whether the touch input is meant for C, V, B, or N keys or a spacebar. As a result, although the visual appearance of the spacebar remains the same, the spatial module 212 maps the touch input with more pixels to correspond to the spacebar at an angle such that touches on the screen at pixels that are closer to the C, V, B, or N keys or even overlap with those keys are assigned to the spacebar.

Figure 6C:
FIG. 6C is an example illustration of a virtual keyboard with visual distinction between letter keys and function keys, according to some embodiments described herein.

FIG. 6C is an example illustration 625 of a virtual keyboard with visual distinction between letters keys and function keys according to some embodiments described herein. In this example, the function keys are inside the red rectangles (which are not a part of the virtual keyboard and are include here for illustration purpose). The letters are displayed in white and the other keys are displayed with visual distinction. For example, the caps lock, the number/character function key, the comma key, the period key, and the backspace are displayed in gray, the enter button is displayed in blue, and the search button and spacebar are displayed in white but as part of a row of keys that includes keys in other colors.

Figure 6D:
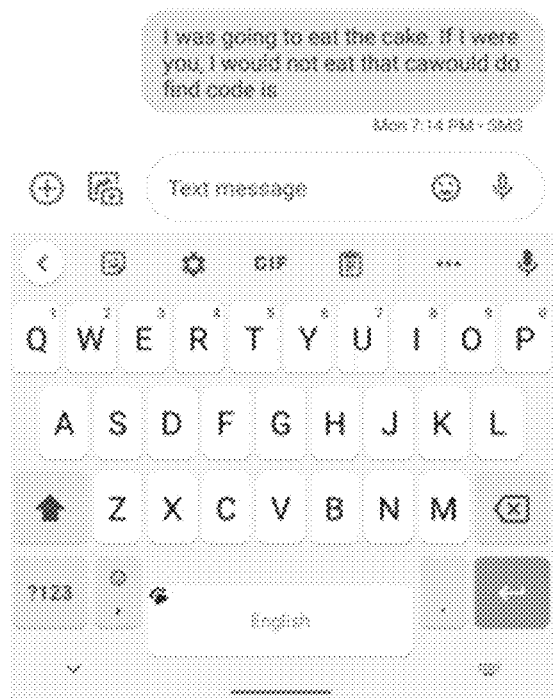
FIG. 6D is an example illustration of a virtual keyboard with the spacebar key shifted downward and offset from neighboring keys, according to some embodiments described herein.

FIG. 6D is an example illustration 630 of a virtual keyboard where the user interface module 216 modified a visual appearance of the spacebar by shifting the spacebar lower to enable distinguishing between touch input mapping to the spacebar and the C, V, B, and N keys according to some embodiments described herein.

Figure 6E:
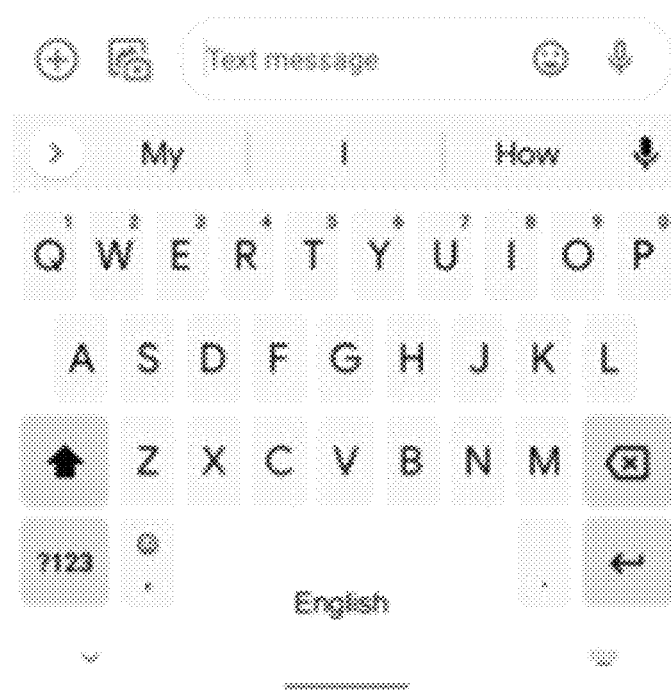
FIG. 6E is an example illustration of a virtual keyboard with a blank space in the place of a spacebar key, according to some embodiments described herein.

FIG. 6E is an example illustration 650 of a space-less design to enable distinguishing between touch input mapping between the spacebar and the C, V, B, or N keys according to some embodiments described herein. In this example, the user interface module 216 generated a virtual keyboard with a spacebar that has no visual outline. Furthermore, the spatial module 212 determines that touch inputs that are not directly on the C, V, B, or N keys correspond to the spacebar. As a result, a greater number of touch inputs are mapped to the spacebar unless they are directly on one of the C, V, B, or N keys.

Figure 6F:
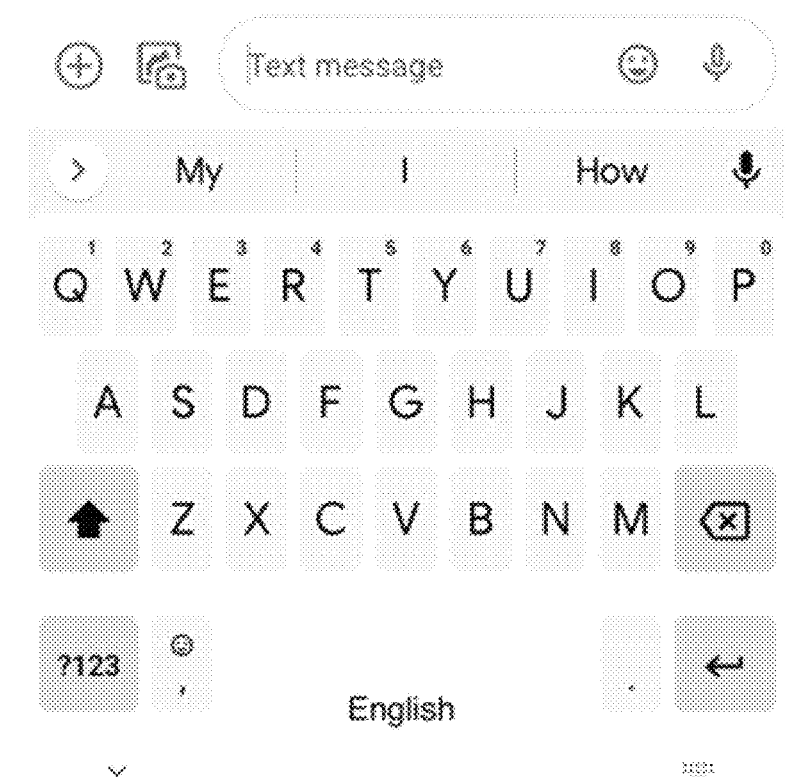
FIG. 6F is an example illustration of using insulation above and below the spacebar key, according to some embodiments described herein.

FIG. 6F is an example illustration 670 of using insulation above and below the spacebar to solve for confusion between the spacebar and the C, V, B, or N keys according to some embodiments described herein. In this example, the user interface module 216 generated a virtual keyboard with a spacebar that both has no visual outline and there is insulation above and below the spacebar so that an even greater number of touch inputs that are not directly on C, V, B, or N keys correspond to the spacebar.

The language module 214 applies a language model to map touch input to one or more candidate keys of a virtual keyboard. In some embodiments, the language module 214 includes a set of instructions executable by the processor 202 to map the touch input to one or more candidate keys of the virtual keyboard. In some embodiments, the language module 216 is stored in the memory 204 of the computing device 200 and can be accessible and executable by the processor 202.

In some embodiments, the language module 214 maps the touch input to one or more second candidate keys of the virtual keyboard that may be different from the one or more first candidate keys that the spatial module 212 mapped the touch input to. For example, the spatial module 212 may determine based on the spatial model that, where the first three letters are "rat" that the fourth letter is "s" based on the proximity of the touch input to the letter "s," but the language module 214 maps the touch input to the letter "e" because the language model indicates that "rate" is a more common word than "rats" or the user types "rate" more frequently than "rats" (if the user permits use of user typing data for such determination). In some embodiments, the language module 214 may be different for different languages.

The language module 214 may map the touch input to the one or more second candidate keys based on comparing the position of the touch input to one or more predicted next keys. In some embodiments, the language module 214 applies a Gaussian distribution to predict the next letter. For example, the Gaussian distribution may indicate a high probability for the letter "n" since it is common, while it may indicate a lower probability for the letter "z" which is far less common in the English language.

The language module 214 may select a particular key from the one or more first candidate keys determined by the spatial module 212 (e.g., "s") and the one or more second candidate keys determined by the language module 214 (e.g., "e") as indicated by the touch input. The one or more first candidate keys may be the same as the one or more second candidate keys or they may be different. In some embodiments, if there is a conflict between the one or more first candidate keys and the one or more second candidate keys, the language module 214 may select a particular key based on the candidate keys that are most likely to form a likely word.

In some embodiments, the language module 214 may perform a post correction of one or more words based on replacing characters with a space or a space with a character using the language model. For example, where two words were "mor" and "ing," the language module 214 may perform post correction to insert the letter "n" and create the single word "morning" from the two words. In this example, post correction automatically corrects the typing error due to incorrect interpretation of a touch of "n" as a touch of spacebar, which leads to two separate words "mor" and "ing" by automatically inserting the letter "n."

The user interface module 216 generates graphical data for displaying a user interface that includes a virtual keyboard. In some embodiments, the user interface module 216 includes a set of instructions executable by the processor 202 to generate the graphical data for displaying the user interface. In some embodiments, the user interface module 216 is stored in the memory 204 of the computing device 200 and can be accessible and executable by the processor 202.

In some embodiments, the user interface module 216 generates graphical data for displaying a user interface, such as a virtual keyboard that is part of an application, such as a messaging application. The user interface module 216 may receive instructions from the language module 214 to display a particular key as indicated by the touch input from the user.

Flowchart 700

Figure 7:
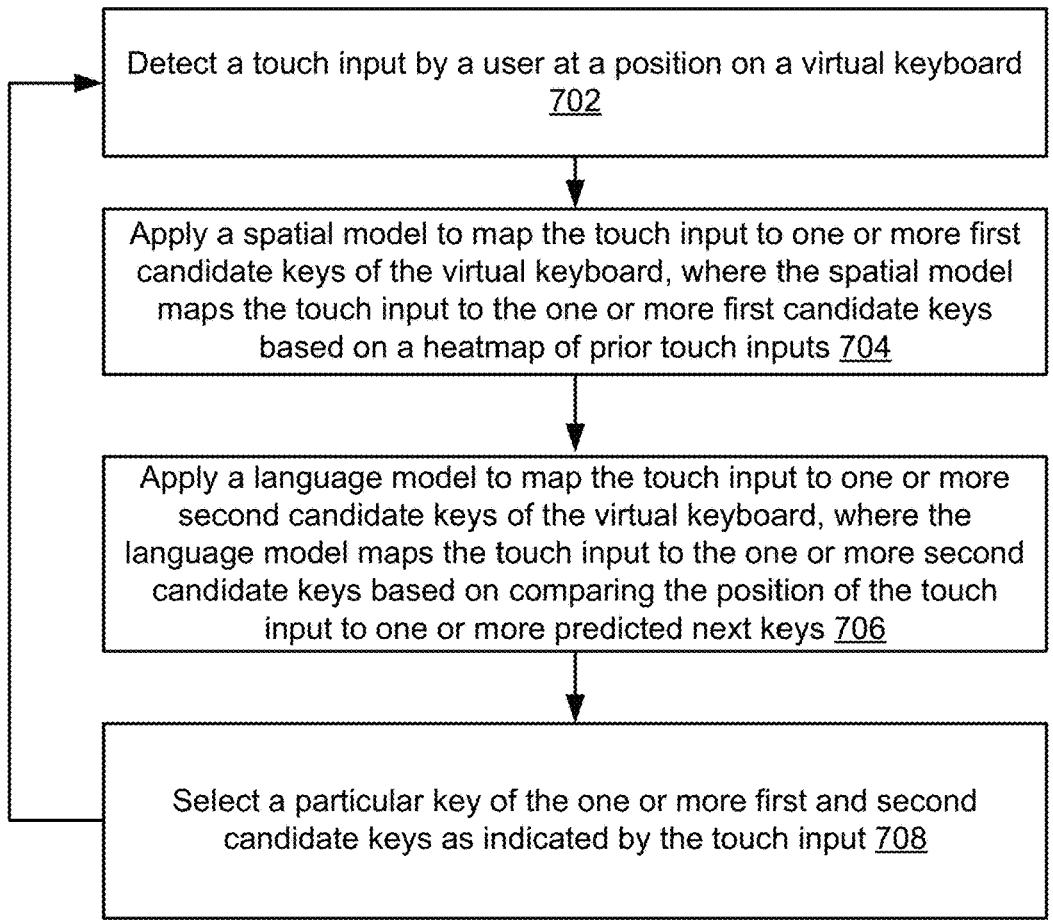
FIG. 7 is a flowchart of an example method to select a particular key based on a touch input received on a virtual keyboard, according to some embodiments described herein.

FIG. 7 is an example flowchart 700 for selecting a particular key for a virtual keyboard according to some embodiments described herein. The flowchart 700 may be performed by the computing device 200 in FIG. 2, such as the mobile device 115 illustrated in FIG. 1.

The method 700 may begin at block 702. In block 702, a touch input is detected by a user at a position on a virtual keyboard. Block 702 may be followed by block 704.

At block 704, a spatial model is applied to map the touch input to one or more first candidate keys of the virtual keyboard. The spatial model maps the touch input to the one or more first candidate keys based on a heatmap of prior touch inputs. Block 704 may be followed by block 706.

At block 706, a language model is applied to map the touch input to one or more second candidate keys of the virtual keyboard. The language model maps the touch input to the one or more second candidate keys based on comparing the position of the touch input to one or more predicted next keys. Block 706 may be followed by 708, At block 708, a particular key of the one or more first and second candidate keys is selected as indicated by the touch input. In some embodiments, a spatial model associates each candidate key with a confidence score (e.g., a spatial score) and a language model (e.g., a language score) associated each candidate key with a confidence score. The confidence scores may also be associated with respective weights (e.g., based on the frequency of the letters). The particular key may be selected based on a combination of the confidence scores and selection of the confidence score that indicates the most likely selection. In some embodiments, the particulate key is selected based on a combined confidence score exceeding a threshold value.

While method 700 has been described with reference to various blocks in FIG. 7, it may be understood that techniques described in this disclosure may be performed without performing some of the blocks of FIG. 7. In some embodiments, one or more of the blocks illustrated in FIG. 7 may be combined.

Although the description has been described with respect to particular embodiments thereof, these particular embodiments are merely illustrative, and not restrictive. Concepts illustrated in the examples may be applied to other examples and embodiments.

Further to the descriptions above, a user may be provided with controls allowing the user to make an election as to both if and when systems, programs, or features described herein may enable collection of user information (e.g., information about a user's data entry via a virtual keyboard, a user's touch patterns on a touchscreen device, a user's keyboard language, a user's virtual keyboard settings, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular embodiments. Different programming techniques may be employed, e.g., procedural or object-oriented. The routines may execute on a single processing device or multiple processors. Although the steps, operations, or computations may be presented in a specific order, the order may be changed in different particular embodiments. In some embodiments, multiple steps or operations shown as sequential in this specification may be performed at the same time.

The invention claimed is:

1. A computer-implemented method comprising:
   detecting a touch input by a user at a position on a virtual keyboard;
   applying a spatial model to map the touch input to one or more first candidate keys of the virtual keyboard, wherein the spatial model maps the touch input to the one or more first candidate keys based on a heatmap of prior touch inputs from the user;
   applying a language model to map the touch input to one or more second candidate keys of the virtual keyboard, wherein the language model maps the touch input to the one or more second candidate keys based on comparing the position of the touch input to one or more predicted next keys;
   selecting a particular key of the one or more first and second candidate keys as indicated by the touch input;
   adjusting a visual appearance of at least a portion of the virtual keyboard based on the heatmap of prior touch inputs from the user;
   updating the heatmap to discard prior touches that are older than a predetermined amount of time; and
   updating the visual appearance of the at least the portion of the virtual keyboard based on the updated heatmap.

2. The method of claim 1, wherein the spatial model uses a first Gaussian distribution based on the heatmap of prior touch inputs near a key center to determine a global key center offset, the spatial model maps the touch input based on the global key center offset, and wherein adjusting the visual appearance of at least the portion of the virtual keyboard is such that all keys in the portion of the virtual keyboard are modified using a same parameter.

3. The method of claim 1, wherein the spatial model is a first spatial model used for the global key center offset and further comprising:
   generating a second spatial model for a key correction; and
   responsive to applying the global key center offset to the touch input and responsive to a size of a word being typed falls below a predetermined threshold, applying a key level center offset to the touch input based on a second Gaussian distribution, wherein the second spatial model maps the touch input further based on the key level center offset.

4. The method of claim 1, wherein the spatial model provides a cluster level correction where all the keys in a same cluster share one parameter.

5. The method of claim 1, wherein adjusting the visual appearance results in the at least a portion of the virtual keyboard being displayed closer to positions of the prior touch inputs as indicated by the heatmap.

6. The method of claim 1, wherein adjusting the visual appearance of at least the portion of the virtual keyboard includes adjusting the visual appearance of a spacebar to extend space at least above or below the spacebar.

7. The method of claim 1, further comprising:
   determining one or more words that include a character that corresponds to the particular key; and
   modifying the one or more words to add or remove a space based on the language model.

8. The method of claim 1, wherein adjusting the visual appearance of at least the portion of the virtual keyboard includes adjusting the visual appearance of a spacebar to include no visual outline.

9. The method of claim 1, further comprising:
   determining an identity of the user that provides the touch input, wherein the identity is determined based on authentication input provided by the user; and
   retrieving the heatmap that corresponds to the user.

10. A computing device comprising:
    a processor; and
    a memory coupled to the processor, with instructions stored thereon that, when executed by the processor, cause the processor to perform operations comprising:
      detecting a touch input by a user at a position on a virtual keyboard;
      applying a spatial model to map the touch input to one or more first candidate keys of the virtual keyboard, wherein the spatial model maps the touch input to the one or more first candidate keys based on a heatmap of prior touch inputs from the user;
      applying a language model to map the touch input to one or more second candidate keys of the virtual keyboard, wherein the language model maps the touch input to the one or more second candidate keys based on comparing the position of the touch input to one or more predicted next keys;
      selecting a particular key of the one or more first and second candidate keys as indicated by the touch input;
      adjusting a visual appearance of at least a portion of the virtual keyboard based on the heatmap of prior touch inputs from the user;
      updating the heatmap to discard prior touches that are older than a predetermined amount of time; and
      updating the visual appearance of the at least the portion of the virtual keyboard based on the updated heatmap.

11. The computing device of claim 10, wherein the spatial model uses a first Gaussian distribution based on the heatmap of prior touch inputs near a key center to determine a global key center offset and the spatial model maps the touch input based on the global key center offset.

12. The computing device of claim 11, wherein the operations further comprise applying a key level center offset to the touch input based on a second Gaussian distribution, wherein the spatial model maps the touch input further based on the key level center offset.

13. The computing device of claim 10, wherein the spatial model provides one or more of a global level correction where all keys in a keyboard layout share one parameter, a cluster level correction where all the keys in a same cluster share one parameter, or a key level correction where each key has its own Gaussian parameters.

14. The computing device of claim 10, wherein adjusting the visual appearance results in the at least a portion of the virtual keyboard being displayed closer to positions of the prior touch inputs as indicated by the heatmap.

15. The computing device of claim 10, wherein adjusting the visual appearance of at least the portion of the virtual keyboard includes adjusting the visual appearance of a spacebar to extend space at least above or below the spacebar.

16. A non-transitory computer-readable medium with instructions stored thereon that, when executed by one or more computers, cause the one or more computers to perform operations, the operations comprising:
   detecting a touch input by a user at a position on a virtual keyboard;
   applying a spatial model to map the touch input to one or more first candidate keys of the virtual keyboard, wherein the spatial model maps the touch input to the one or more first candidate keys based on a heatmap of prior touch inputs from the user;
   applying a language model to map the touch input to one or more second candidate keys of the virtual keyboard, wherein the language model maps the touch input to the one or more second candidate keys based on comparing the position of the touch input to one or more predicted next keys;
   selecting a particular key of the one or more first and second candidate keys as indicated by the touch input;
   adjusting a visual appearance of at least a portion of the virtual keyboard based on the heatmap of prior touch inputs from the user;
   updating the heatmap to discard prior touches that are older than a predetermined amount of time; and
   updating the visual appearance of the at least the portion of the virtual keyboard based on the updated heatmap.

17. The non-transitory computer-readable medium of claim 16, wherein the spatial model uses a first Gaussian distribution based on the heatmap of prior touch inputs near a key center to determine a global key center offset and the spatial model maps the touch input based on the global key center offset.

18. The non-transitory computer-readable medium of claim 17, wherein the operations further comprise applying a key level center offset to the touch input based on a second Gaussian distribution, wherein the spatial model maps the touch input further based on the key level center offset.

19. The non-transitory computer-readable medium of claim 16, wherein adjusting the visual appearance results in the at least a portion of the virtual keyboard being displayed closer to positions of the prior touch inputs as indicated by the heatmap.

20. The non-transitory computer-readable medium of claim 16, wherein adjusting the visual appearance of at least the portion of the virtual keyboard includes adjusting the visual appearance of a spacebar to extend space at least above or below the spacebar.

* * * * *